United States Patent [19]

Shizuo et al.

[11] Patent Number: 5,091,026
[45] Date of Patent: Feb. 25, 1992

[54] METHOD FOR CONTINUOUSLY VULCANIZING A SELF-MOLDING HOSE

[75] Inventors: Yokohori Shizuo; Miyamoto Kenzo, both of Kako; Fukushima Kojo, Osaka; Tsujimoto Masami, Hyogo; Onda Kenji, Fukushima; Sato Kan, Tokyo, all of Japan

[73] Assignee: Toyo Tire & Rubber Co., Ltd., Osaka, Japan

[21] Appl. No.: 522,245

[22] Filed: May 11, 1990

Related U.S. Application Data

[62] Division of Ser. No. 268,573, Nov. 8, 1988, Pat. No. 4,957,792.

Foreign Application Priority Data

| Nov. 9, 1987 | [JP] | Japan | 62-282700 |
| Jul. 11, 1988 | [JP] | Japan | 63-173120 |
| Aug. 3, 1988 | [JP] | Japan | 63-194132 |
| Aug. 9, 1988 | [JP] | Japan | 63-199299 |

[51] Int. Cl.⁵ ............... B29C 35/06; B29C 53/20
[52] U.S. Cl. .............. 156/149; 138/144; 156/195; 156/242; 264/103; 264/236; 264/257; 264/324; 264/347; 427/366; 427/372.2
[58] Field of Search .......... 264/175, 347, 280, 236, 264/563, 566, 567, 257, 103, 324; 425/363, 327, 392; 138/126, 137, 144; 156/143, 148, 149, 184, 195, 242, 243, 190; 427/359, 366, 372.2

[56] References Cited

U.S. PATENT DOCUMENTS

| 1,497,112 | 6/1924 | Matthew | 425/363 |
| 2,179,444 | 11/1939 | Bierer | 264/280 |
| 3,083,130 | 3/1963 | Strandquist | 156/184 |
| 3,368,017 | 2/1968 | Lister | 156/149 |
| 4,111,628 | 9/1978 | Taylor | 425/363 |
| 4,175,992 | 11/1979 | Grawey | 156/149 |
| 4,199,542 | 4/1980 | Taylor | 425/363 |
| 4,311,547 | 1/1982 | Biggs et al. | 264/347 |
| 4,613,389 | 9/1986 | Tanaka | 156/195 |
| 4,707,206 | 11/1987 | Trepus, Jr. et al. | 156/149 |
| 4,878,976 | 11/1989 | Asakura | 156/195 |

FOREIGN PATENT DOCUMENTS 1526589 9/1978 United Kingdom ............ 264/347

*Primary Examiner*—Jeffery Thurlow
*Assistant Examiner*—Mathieu Vargot
*Attorney, Agent, or Firm*—Koda and Androlia

[57] ABSTRACT

A method for continuously vulcanizing a self-molding hose by external heating including the steps of first forming continuous strip of self-molding material which includes a heat-shrinkable woven fabric, a first vulcanized elastomer topping layer provided on a top surface of the heat-shrinkable woven fabric, a second vulcanized elastomer topping layer provided on an undersurface of the fabric with the second vulcanized elastomer topping layer being thinner than the first vulcanized elastomer topping layer and an unvulcanized elastomer topping layer provided on the undersurface of the second vulcanized elastomer topping layer. Then the continuous strip is overlappingly wound on a former to create a circular hose and the circular hose is continuously introduced into a gap between rotary drums of vulcanization apparatus at the same rate as the rate of the circular hose formation so that the circular hose is pressed flat, heated and vulcanized and converted into a flat hose.

1 Claim, 6 Drawing Sheets (A)

(B)

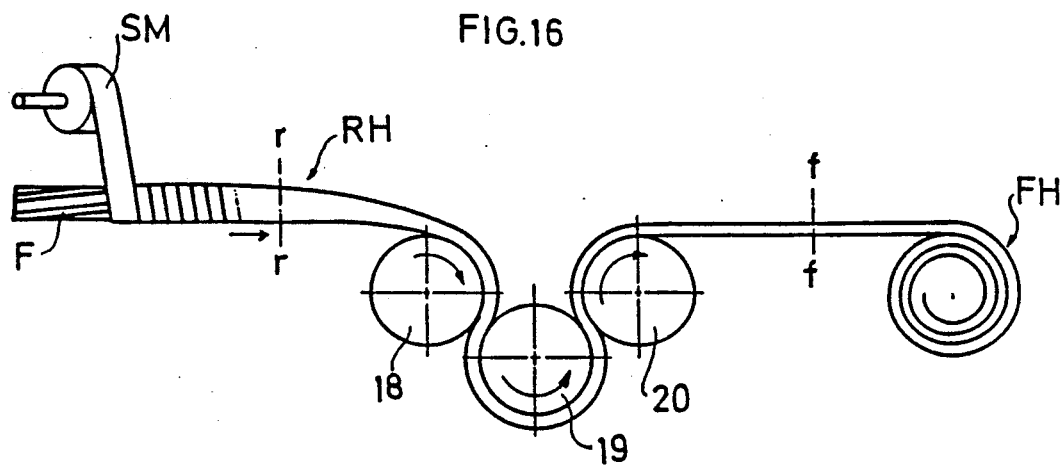
FIG.16
FIG.17 (A)    FIG.17 (B)    FIG.17 (C)
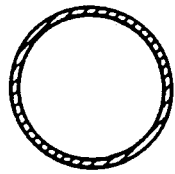  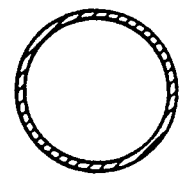
FIG.18 (A)    FIG.18 (B)    FIG.18 (C)
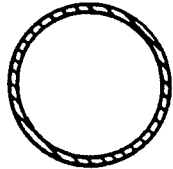  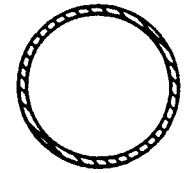

METHOD FOR CONTINUOUSLY VULCANIZING A SELF-MOLDING HOSE

This is a division of application Ser. No. 268,573, filed Nov. 8, 1988, now U.S. Pat. No. 4,957,792.

BACKGROUND OF THE INVENTION

1. Field of the Invention

The present invention relates to a self-molding hose which does not require the use of any restricting fabric or other external-pressure molding part and a continuous vulcanization method. More specifically, the present invention relates to (a) a construction of a self-molding hose which may have any of various shapes, and which completely changes the restricting-fabric molding method that has long been in conventional use, (b) a method for the continuous vulcanization of a self-molding hose by means of internal heating, which greatly simplifies the manufacture of such a hose, and (c) a method for the continuous vulcanization of a long, flat rubber hose consisting of a self-molding hose which is thin, light in weight and easy to ship and handle by means of external heating.

2. Prior Art

Except in cases where a special molding method such as the lead encasing system, etc., is used, all conventional hoses are ordinarily formed and vulcanized by the restricting-fabric molding method.

The principal conventional hose shapes may be roughly classified as follows according to structure:

(a) Ply hoses consisting of inner tube rubber, reinforcing fabric layer, and outer skin rubber:

Such ply hoses are formed in an unvulcanized state around a core mold consisting of an iron pipe; the circumference of the hose is formed by wrapping a restricting fabric around the hose, and the hose is then vulcanized in a vulcanizing can.

(b) Braided hoses consisting of inner tube rubber, braided reinforcing layer of stranded yarn (or braided reinforcing layer of wire), and outer skin rubber (exterior surface smooth or with striations):

In most cases, an unvulcanized braided hose is produced without using a core mold, the hose being heated in a vulcanizing can by means of the lead encasing molding system (using internal pressure) Furthermore, such hoses may also be formed and vulcanized by means of a mold forming system using a heating plate. In addition, as in the case of (a) above, such hoses may be produced by forming an unvulcanized braided hose around a core mold, wrapping and tightening a restricting fabric around the outside of the hose, and then vulcanizing the hose by heating the hose in a vulcanizing can.

(c) Wire-containing hoses (single wire or double wire):

Such hoses are available in various types: i.e., the exposed wire type, embedded wire type and semi-embedded wire type, etc. Various configurations (bellows type exterior, smooth exterior, fabric-wrapped exterior, knitted exterior, rubber-wrapped exterior, etc.) are formed in accordance with the conditions of use.

(d) Bandless hoses in which mouthpieces are bonded in an unvulcanized state, and are then vulcanized and fixed by firing.

The hoses described in (a), (c) and (d) above are all formed in an unvulcanized state around a core mold. In all cases, a narrow woven fabric strip is wrapped around the circumference of the resulting unvulcanized hose in two or more layers and is wet with water to produce a tightened state. The hose is thus formed by means of a restricting-fabric system and is then vulcanized by heating in a vulcanizing can.

Particularly in the case of (c) where an external bellows shape is produced, a rope is wrapped and tightened around the circumference of the hose (following the wrapping of the restricting fabric) in order to produce the bellows shape, and the hose is then placed in a vulcanizing can and vulcanized. Furthermore, the mouthpiece areas of the abovementioned bandless hoses (i.e., the areas around the mouthpiece) are pressed especially thoroughly by means of a restricting fabric and a rope. Accordingly, such restricting-fabric molding systems require the troublesome operation of removing the restricting fabric and rope following vulcanization.

As described above, most forming methods and vulcanization methods commonly used in the past have used a laminating system (utilizing a mandrel) for forming and have used direct steam vulcanization in a vulcanizing can. Accordingly, a vulcanizing can which is as long as or longer than the mandrel is required. As a result, the length of hose that can be manufactured is inherently limited, with a length of 10 to 20 m ordinarily being the limit.

Furthermore, direct steam vulcanization suffers from poor thermal efficiency, and when the vulcanizing can is large, time is required in order to elevate the temperature of the vulcanizing can itself. Moreover, in the case of a structure in which various types of soft raw materials are laminated, internal air bubbles are present. Accordingly, the method as follows is ordinarilly used: i.e., the hose is squeezed by means of a restricting fabric so that the hose is degassed. Afterward, the hose is placed in a vulcanizing can and steam-vulcanized; following this vulcanization, the restriction is loosened and the hose is removed from the mandrel. Thus, the manufacturing method includes a large number of intermittent processes.

Such a system is suitable for hoses composed entirely of raw materials in a crude state, thick hoses which require a long vulcanization time, and high-pressure hoses which use a multi-layer reinforcing fabric. Furthermore, methods using a molding system such as lead encasing vulcanization etc., are suitable for small-diameter hoses. In these methods, vulcanization is performed under internal pressure using a mold instead of a restricting fabric; accordingly, the length of hose that can be produced is considerably longer than in the case of the previously mentioned method. However, such methods depend on batch vulcanization of a fixed length of hose. The forming process is quasi-continuous; however, a large and expensive manufacturing apparatus is required for extrusion, braiding, outer skin covering, molding and vulcanizing processes, etc.

Furthermore, conventional methods for the formation and vulcanization of hoses which are flat in cross section include (a) methods in which the hose is formed in a flat cross-sectional shape from the beginning using a flat mandrel, and is vulcanized in this same flat shape, and (b) methods in which the hose is formed in a circular cross-sectional shape using a circular mandrel, after which the mandrel is removed and the unvulcanized circular hose is flattened by pressing and vulcanized by heating.

Furthermore, in the method for manufacturing a flat hose described in Japanese Patent Publication No.

62-49863, substantially the following method is disclosed: "A method for manufacturing a flat hose consisting of (a) a first step in which an unvulcanized cylindrical hose is formed by successively wrapping an inner rubber layer, a fibrous reinforcing layer and a covering rubber layer with some overlap around a mandrel, (b) a second step in which a restricting fabric is wrapped around the circumference of the unvulcanized formed hose, after which the hose is vulcanized by heating, (c) a third step in which the hose is flattened by tightly closing one end thereof and applying vacuum suction to the other end thereof after the restricting fabric and mandrel have been removed, and (d) a fourth step in which the hose is again vulcanized by heating the hose in a flattened state."

In conventional restricting-fabric forming methods as mentioned above, the restricting fabric is generally formed by cutting a woven fabric with a thickness of 0.2 to 0.4 mm to a narrow width. This restricting fabric is then wrapped and tightened around the outer-skin rubber layer of the unvulcanized formed hose. Accordingly, since both edges of the restricting fabric are free edges, the woven texture at the edges of the fabric is disturbed, so that it is difficult to apply uniform force across the entire width of the restricting fabric. Furthermore, since the pressure-maintaining characteristics of such a restricting fabric are poor, the wrapping of at least two or more layers of restricting fabric is required. Moreover, since the restricting fabric bites into the unvulcanized rubber of the the outer skin of the hose, the outer-skin rubber of the hose must be of such a thickness that no problems will arise even if this rubber is bitten into by the restricting fabric, i.e., the thickness of the rubber must be at least two to three times the thickness of the restricting fabric, and the thickness of rubber actually used is generally even 1.5 to 3 mm greater than the required thickness. Accordingly, not only is the external appearance of the hose damaged by the irregular imprinting of restricting-fabric wrapping traces and texture on the outer surface of the hose, but it is also difficult to achieve uniform pressured distribution; hence, dimensional uniformity cannot be obtained.

Furthermore, dirt tends to collect in the imprinted fabric texture of the hose during use, and this dirt is difficult to remove. As a result, the hose becomes unattractively soiled. Moreover, the aforementioned restricting fabric is repeatedly used; however, this restricting fabric becomes soiled during vulcanization in the vulcanizing can, and the degree of soiling increases as the restricting fabric is repeatedly used. Accordingly, from the second occasion of use on, the outer-skin rubber of the hose being manufactured is soiled as a result of the soiling of the restricting fabric. In the case of brightly colored hoses (i.e., hoses with a color other than black), the effect of the coloring is seriously impaired by this soiling. Furthermore, a restricting fabric which is repeatedly used deteriorates as a result of exposure to steam and heat during vulcanization. The strength and elongation of the restricting fabric change as the fabric is repeatedly used, and there is also a change in the uniformity of these properties, so that uniform tightening strength cannot be obtained. Accordingly, bonding strength and dimensions vary from hose to hose.

In addition to the abovementioned defects in terms of physical properties, the restricting-fabric forming method (as described above) requires complicated manufacturing processes, i.e., a restricting fabric preparation process, a restricting fabric and rope wrapping and tightening process, and a restricting fabric and rope removal process, etc. This leads to increased costs. Furthermore, the unvulcanized rubber material in the interior surface layer of the hose has an excessive degree of freedom which leads to various fluctuations. Accordingly, various means of suppressing such fluctuations must be employed.

SUMMARY OF THE INVENTION

Accordingly, it is a primary object of the present invention to provide (a) a hose which can be formed without using a restricting fabric as a replacement for hoses formed using a restricting fabric, which have many problems in their long history of conventional use.

It is another object of the present invention to provide a simple continuous molding and vulcanizing method for manufacture of such a hose formed without using a restricting fabric.

It is a further object of the present invention to provide a long hose of unrestricted length to be continuously vulcanized at a rapid rate, so that a hose having a good bonding and dimensional stabilities and an attractive external appearance can be inexpensively obtained.

In the hose of the present invention, a restricting fabric, which causes problems in conventional methods in which hoses are formed from an unvulcanized rubber material with the outer portion thereof comprising a reinforcing fabric, outer-skin rubber and restricting fabric, is eliminated, and the function ordinarily performed by this restricting fabric is instead performed by a part of the hose itself.

The above and other objects of the present invention are accomplished by a unique structure of a self-molding hose wherein instead of an outer layer of the hose, which may have any of various shapes and comprise any of various elastomers and reinforcing fabrics and further reinforcing wire if desired, a self-molding part is employed. This self-molding part is formed by (i) installing elastomer topping layers on both surfaces of a heat-shrinkable woven fabric such as polyester, nylon, etc., with a thicker topping layer on a surface side of the fabric and a thinner layer on underside of such fabric, or installing such an elastomer topping layer only on a surface side of such fabric, (ii) vulcanizing the fabric and topping layer or layers under tension, and (iii) further installing an unvulcanized elastomer topping layer on the underside of the vulcanized woven fabric. In this case, the vulcanized surface of the self-molding part is placed on the outside of the hose, and the hose is vulcanized and molded in this state.

Furthermore, according to the method of the present invention, firstly, an interior heating method is achieved by a method for continuously vulcanizing a self molding hose which is formed by continuous feeding of a hose molding comprising any desired combination of inner-layer parts, outer layer parts and reinforcing layers, etc., wherein continuous vulcanization is achieved by establishing a high-temperature steam jet area in the interior of the hose by means of a steam pipe and establishing a high-temperature heating area comprising a steam range which extends before and behind the steam jet area covering a length necessary for vulcanization which is determined by the feed rate of the hose and vulcanization rate, etc.

Also, an exterior heating method is achieved by a method for continuously vulcanizing a self-molding hose in which a strip of self-molding material having a specified width is wrapped around a former so that vulcanized surface-side elastomer is set on the inside, a circular hose to be continuously formed is continuously introduced into a gap between rotary drums of a vulcanizer including a combination of heating drums rotating at the same rate as the rate of hose formation so that the hose is pressed flat, heated and vulcanized and is thus converted into a flattened hose.

BRIEF DESCRIPTION OF THE DRAWINGS

FIG. 16 is a schematic diagram which illustrates one example of an apparatus for the continuous vulcanization of a self-molding hose by means of external heating;

FIG. 17(A) is a cross sectional view taken along line r—r in FIG. 16;

FIG. 17(B) is a cross sectional view taken along line f—f in FIG. 16;

FIG. 17(C) is a cross sectional view of a flat hose during internal-pressure loading;

FIG. 18(A) is a cross sectional view of a conventional hose vulcanized in cylindrical form;

FIG. 18(B) is a cross sectional view of a conventional flat hose; and

FIG. 18(C) is a cross sectional view of a conventional flat hose during internal-pressure loading.

DETAILED DESCRIPTION OF THE INVENTION

Figure 1:
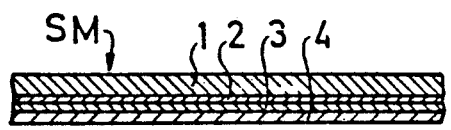
FIGS. 1(A) and 1(B) are partial enlarged cross sectional views of self-molding parts.
Figure 1:
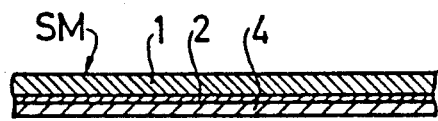

More specifically, in the present invention an organic fiber material such as polyester or nylon, etc., which has the property of shrinking when heated is formed into a fabric. This woven fabric is formed into a long sheet with a specified width, and is then treated with, for example, RFL (resorcinol-formalin-latex) so that it is converted into a state in which it will easily bond with elastomeric substances.

The woven fabric is then topped with an unvulcanized elastomer by means of a calendar. In this topping operation, a topped fabric is formed in which (a) both surfaces of the fabric are topped with a thick topping layer being formed on the surface side and a thin topping layer being formed on the underside, or (b) only the surface side is topped, with no topping layer being formed on the underside. The woven fabric used for this topped fabric may vary according to the type and intended use of the hose being manufactured. Ordinarily, however, the total thickness of the topped fabric is approximately 1.0 to 0.3 mm. This topped fabric is vulcanized under tension. For example, the fabric may be vulcanized by means of a Rotocure system (rotary drum vulcanizing system) or an electron beam bridging system. After this vulcanization, the underside of the topped fabric, which is covered with a thin topping layer or with no topping layer at all, is again topped with an unvulcanized elastomer (which may be the same material as that used before, or a different material). In this case as well, the vulcanization performed by the abovementioned vulcanizing system may be semi-vulcanization.

One example of a hose which uses such a self-molding part with an unvulcanized elastomer on its underside and a vulcanized elastomer on its surface side is a hose in which the required hose structure is formed by wrapping such a self-molding part around the outside of the reinforcing fabric or the outside of the reinforcing wire leaving no gaps between the self-molding part and the fabric or wire of an unvulcanized hose formed into any of various hose shapes by an ordinary method. This formed hose is then placed in an ordinary vulcanizing can and cured by open steam curing, producing a self-molded hose. In other words, no conventional restricting-fabric forming system is used in this case; instead, the self-molding part provides a tightening action through heat-shrinkage. Thus, the hose shows self-molding properties.

The above-described self-molding hose uses a self-molding part on the outside of a conventional hose which may have any of various shapes.

Next, a self-molding hose which uses self-molding parts on both the inside and outside surfaces of the hose will be described.

In this type of self-molding hose, the self-molding parts constitute the major portion of the hose. Self-molding parts are used in both the inner surface layer and outer surface layer of the hose. If necessary, a reinforcing fiber material such as a reinforcing fabric, etc., and/or a reinforcing wire material are inserted between the two self-molding parts, thus producing a self-molding hose which may be formed in any of various shapes. Specifically, the self-molding parts on the outside and inside surfaces of this hose are oriented so that the vulcanized surfaces on the surface sides of the self-molding parts face outward and inward, respectively. If necessary, any of various types of materials used for hose formation, e.g., spiral-form reinforcing wire materials, unvulcanized elastomer reinforcing fabrics and unvulcanized elastomer sheets, etc., may be inserted between the facing unvulcanized elastomer surfaces of the self-molding parts, so that the required hose structure is formed. This wrapped rubber hose is placed in an ordinary vulcanizing can and cured by open curing, so that a hose is molded. In other words, a conventional restricting-fabric forming system is not used; instead, the inner and outer self-molding parts of the hose provide tightening action, so that the hose exhibits self-molding properties.

Furthermore, the degree of vulcanization of the vulcanized surfaces of the abovementioned self-molding parts may be appropriately adjusted in accordance with the conditions of the hose structure, etc.; generally, a degree of vulcanization of approximately 50% to 70% is desirable.

As described above, the abovementioned self-molding parts include a woven fabric topped with an elastomer, and the surface-side topping layer of each self-molding part is vulcanized. As a result, the woven structure of the woven fabric is firmly fixed, so that the fabric can be subjected to strong tension. In hose formation, a strong, uniform wrapping force operates so that a uniformly strong adhesive force is obtained. Furthermore, this strong wrapping force is maintained "as is" by the unvulcanized elastomer on the underside of each self-molding part. Moreover, a shrinking force is caused to operate by the vulcanizing heat, so that the self-molding parts are set by vulcanization. Of course, during wrapping, a sufficient tensile force must be applied to the self-molding parts; furthermore, depending on the hose structure and shape, sufficient adhesion may be insured by applying pressure rolls or by means of a pressing bar, etc., if necessary.

Furthermore, elastomeric substances which may be used in the self-molding hose of the present invention include all elastic polymeric substances such as natural rubber, synthetic rubbers and other rubber-form elastic substances, etc. The substance(s) thus used may be approximately selected in accordance with the application involved.

In the examples of self-molding hoses described above, the reinforcing vulcanized elastomer fabric has self-molding properties; furthermore, the external surface of the hose is formed by an elastomer whose surface is vulcanized into a smooth state. Accordingly, not only is there no need for a restricting-fabric forming operation, in which the reinforcing fabric and outer-skin rubber are bonded together and wrapped with a restricting fabric, or restricting-fabric removal operation, as there is in the case of conventional methods, but the external appearance of the hose obtained is also aesthetically pleasing. Furthermore, since a uniformly strong adhesive force is obtained, forming conditions are produced which insure uniform dimensions, and an outer layer of uniform thickness is formed. There is no need to make a thickness greater than that required for the hose; accordingly, a thin hose can be formed. In addition, since the hose is not soiled by any restricting fabric, brightly colored hoses can easily be produced. Furthermore, with a self-molding part used on the interior surface of the hose as well, there will be no fluctuation as in the case of an unvulcanized elastomer. Accordingly, an interior surface layer of uniform thickness can also be formed, and the formation of an extremely thin interior surface is facilitated.

Next, an vulcanization method other than the abovementioned general vulcanizing can vulcanization method, i.e., a method for continuous vulcanization of a self-molding hose by means of internal heating, which is suitable for relatively thin self-molding hoses, will be described.

First, a continuous hose-forming apparatus is used. For example, a former may be used in which a multiple number of obliquely oriented feed bars are assembled in an assembly frame so that a formed hose body is continuously fed as the respective constituent materials which form the hose are continuously laminated, i.e., the apparatus may be designed so that it operates in the manner of a screw.

Figure 9:
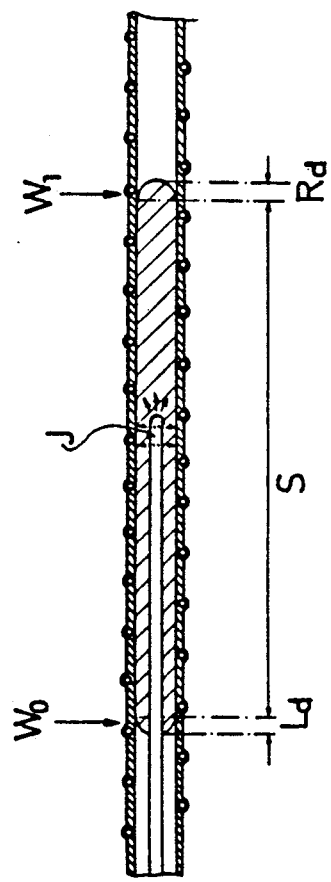
FIG. 9 is a schematic explanatory diagram of a continuous forming and vulcanizing apparatus which illustrates one example of a method of the present invention for continuously vulcanizing a self-molding hose by means of internal heating.

FIG. 9 is a rough explanation diagram which illustrates one example of such a method for the continuous vulcanization of a self-molding hose by means of internal heating. As is shown in this Figure, a former F includes a multiple number of feed bars ranging from several bars to ten bars depending on the size of the hose. These feed bars 15 are fixed in a mounting frame 16 so that each feed bar is obliquely oriented by a fixed amount with respect to the center-line of the hose being formed. Furthermore, the system is arranged so that the diameter of the overall feed bar assembly decreases to a specified diameter in the direction of flow of the product being formed. In regard to the rotation of this former F including the feed bars 15, the former F is driven by a driving device 17 etc., so that it rotates at a constant circumferential speed. If hose formation is accomplished by supplying the respective constituent materials to be laminated (the inner layer material, reinforcing material and outer layer material may be appropriately selected in accordance with the type of hose being formed) successively from the innermost layer outward at oblique angles to the former F, and forming a hose by wrapping these materials around the former F, then, since the rotating feed bars are each inclined by a fixed amount, the formed hose will be continuously fed out. The example illustrated in FIG. 9 uses an inner self-molding part ISM, a spiral-form reinforcing wire material comprising a steel wire 13, and an outer self-molding part OSM. The composition of the self-molding parts used here is illustrated in FIG. 1(B).

With regard to the continuous vulcanization of this continuously formed self-molding hose, self-molding parts are used on both the inside and outside surfaces of the hose; in the inner surface layer, the self-molding part is wrapped so that the vulcanized surface-side elastomer faces inward, while in the outer surface layer, the self-molding part is wrapped with a prescribed width of wrapping so that the vulcanized surface-side elastomer faces outward. In this way, a self-molding hose body is produced. Accordingly, since vulcanization can be completed merely by vulcanizing the unvulcanized area between the two self-molding parts, continuous vulcanization can be performed by means of steam heating of the internal surface of the hose. Furthermore, this steam heating is accomplished by means of a steam pipe 14 which is installed in the center of the former shown in FIG. 9.

Wire material such as steel wires, etc. may be appropriately selected in accordance with the intended use of the hose. Moreover, an unvulcanized elastomer sheet may be appropriately used in addition to the unvulcanized topping layers in order to improve adhesion and sealing characteristics. In addition, sealing is also improved by wrapping the materials under strong tension so that the unvulcanized topping portions are sufficiently pressed, or by using an auxiliary pressing means such as rollers, etc.

The cylindrical hose tube formed under the conditions selected as described above is continuously fed out at a constant rate. A steam pipe which supplies steam is installed at a specified point located approximately 1 to 2 meters inside the fed-out hose, and a jet part J is formed in the vicinity of the tip of this steam pipe. Steam at a pressure corresponding to a specified temperature is caused to jet from this jet part J onto the interior surface of the hose. As a result, a steam action range S is established as shown in FIG. 9, and the hose is continuously vulcanized.

If Po is the pressure of the steam that jets from the jet part J and To is the temperature of the steam, and if S is the steam action range in which the pressure and temperature operate, then the pressure and temperature drop abruptly at the point Sl located at the left end of the range S. Of course, there is also a gradual drop in Po and To across the space extending from the position of the set part J to point Sl. At point Sl, the low-temperature hose which is being continuously laminated and formed causes a drop in both the steam temperature To and pressure Po. When the steam temperature drops below 100° C., the steam undergoes a phase change and acts as a drain so that the pressure difference relative to the outside disappears. In other words, steam no longer reaches the formed and laminated layers. Meanwhile, at point Sr at the right end of the steam action range S, the steam jetting from the jet part loses its differential pressure just as it does at point Sl. Furthermore, it would also be possible to afford pressure relief and gradual cooling (through natural cooling) by installing a screening plate, which has a diameter smaller than the internal diameter of the hose, around the steam pipe at point Sl. Moreover, the length of the steam action range S may also be adjusted by cooling the outside of the hose by means of water cooling Wo and W1 at points Sl and Sr. Furthermore, it would also be possible to afford pressure relief and gradual cooling through natural cooling in the same manner as at point Sl by extending the steam pipe beyond the tip of the jet part and installing a screening plate, which has a diameter smaller than the internal diameter of the hose, around the supporting pipe. In addition, the utilization of the mounting frame 16 of the rotating bars in order to install a rotating plug in the area where the hose is fed out from the forming area may also be useful.

Furthermore, in this continuous vulcanization method, the vulcanization conditions can easily be altered by varying the length of the steam action range S. Specifically, the pressure Po and the temperature To of the steam jetting from the jet part can be appropriately adjusted, and the cooling rate can be adjusted by water cooling. Accordingly, even during the continuous operation, the vulcanization conditions can be adjusted to optimal conditions in accordance with the vulcanization rate of the elastomer used and the diameter and thickness of the hose, etc.

Furthermore, with regard to the drainage of drain steam, drainage can be accomplished by inclining the vulcanizing line beforehand. In this case, since drain steam is generated at two points, i.e., point Sl at the left end of the steam action range and point Sr at the right end of the range, inclination of the vulcanizing line in one direction only will cause some of the drain steam to flow downward through the steam action range S, thus causing a drop in the temperature and pressure of the steam in the range S. Accordingly, in the case of drainage of drain steam by means of an inclined system, it is desirable to form slopes in the part supporting the hose, i.e., conveyer, etc., so that both ends of the steam action range S are slightly lower than the middle of such range and thus allow drainage in both directions due to the low positions of points Sl and Sr. In some cases, however, it may also be effective to cause forced drainage of the drain steam by means of a suction tube installed inside the hose.

In this continuous vulcanization system, steam does not contact the outside surface of the hose as it does in most conventional open vulcanization systems using a vulcanizing can. Thus, no surface roughness, etc., is generated. Furthermore, in the area of the steam action range S, steam pressure is applied from the inside. Accordingly, there is less cause to worry about dimensional stability, residual air bubbles and insufficient adhesion than there is in the case of pressure-free vulcanization. In the case of the present self-molding material, furthermore, a shrinking force is caused to be operated by the heat to which the hose is subjected as it passes through the steam action range S. As a result, a tightening force is created, and this acts together with the jet pressure Po of the steam inside the hose to apply a strong restricting force to the hose during vulcanization, so that a hose with a superior shape and superior physical properties can be obtained.

Next, the formation of the aforementioned steam action range S will be described:

If VH is the rate of hose formation (in mm/sec.) and TH is the time required for vulcanization of the hose by heating (expressed in seconds), then the distance for which the hose needs to be heated, i.e., the steam action range S, can be expressed as follows:

$$S = VH \times TH \ (mm)$$

Thus, if TH=600 sec. and VH=5 mm/sec., $$S = 5mm \times 600 = 3000 \ mm.$$

Specifically, the range of S is determined by establishing TH beforehand in accordance with the rubber composition and heating temperature and adjusting VH. Furthermore, the steam is converted into drain steam at points Sl and Sr at the left and right ends of the steam action range S. Accordingly, if the temperature at these points is 100° C. and the temperature at the jet part J is set at 140° C., the temperature gradient between the jet part J and points Sl and Sr at the left and right ends of the steam action range will be 40° C. If td is the time required for a temperature drop of 40° C. between the jet part J and point Sl, and between the jet part J and point Sr (i.e., the time required for the temperature of the steam to drop to 100° C. from the temperature at the jet part J), then td can be determined using the following equation:

$$td = -\left(\frac{2Wt}{\pi}\right)^2 \cdot \frac{1}{a} \cdot \ln\left\{\frac{\pi}{4}\left(\frac{\theta - \theta_1}{\theta_0 - \theta_1}\right)\right\} \quad (1)$$

Here,
- td: Time required for temperature to drop to 100° C. from temperature at jet part (sec.)
- Wt: Thickness (wall thickness) of formed rubber hose (mm)
- a: Thermal conductivity of formed hose (mm²/min.)
- $\theta$: Internal surface temperature of hose at left-end point Sl and right-end point Sr (100° C.) (drain)
- $\theta_0$: Initial temperature (temperature at jet part)
- $\theta_1$: External surface temperature of hose (the temperature of cooling water).

For example, the following values are entered into the Equation (1) above:
Wt=2 mm
a=12.3 (mm²/min.)
$\theta$=100° C.
$\theta_0$=140° C.
$\theta_1$=5° C.

$$\therefore td = -\left(\frac{2 \times 2}{\pi}\right)^2 \cdot \frac{1}{12.3} \cdot \ln\left\{\frac{\pi}{4}\left(\frac{100 - 5}{140 - 5}\right)\right\}$$

Accordingly, when the left-end point Sl and the right-end point Sr are cooled using cooling water at a temperature of 5° C., steam at 140° C. is converted into drain steam in approximately 4.7 seconds. Hence, the drain conversion distances Ld and Rd for the left-end point Sl, and right-end point Sr are td×VH=4.7×5=23.5 (mm). In other words, these distances may be viewed as being approximately 24 mm.

Furthermore, the interior surface of the hose comes into direct contact with the steam so that the elevated temperature of the interior surface of the hose more or less reaches the maximum temperature of the steam. Accordingly, a sufficiently vulcanized state can be obtained. In particular, since this hose is made up of self-molding parts, the outer surface of the outer layer part is already appropriately vulcanized beforehand. Accordingly, the hose is formed in an extremely stable state, with no softening, tackifying or fading of the outside surface. Furthermore, this vulcanized outer skin layer acts as a heat-insulating material, and thus prevents the escape of heat from the inside surface, so that favorable vulcanization is achieved. Furthermore, since the interior surface of the inner-layer part is also appropriately vulcanized beforehand, the unvulcanized intermediate parts are subjected to a tightening forces by the heat shrinkage of the self-molding parts, so that a favorable vulcanized state can be obtained in a relatively short period of time by internal heating.

Accordingly, the present invention makes it possible to use a single, simple manufacturing method which is completely different from conventional methods. A continuous vulcanizing action is obtained; theoretically, therefore, a hose of any desired length or of unlimited length can be freely and continuously vulcanized in a single smoothly flowing process without any change of working processes as in conventional methods. Furthermore, in this method, an efficient vulcanizing action is obtained as a result of the small-volume high-temperature heating action range afforded by the relatively short direct steam action range.

Furthermore, vulcanization is effected by successive heating under pressure from the interior surface, so that good adhesion is obtained between the inner-layer material and the outer-layer material under the pressure created by the aforementioned shrinking force. In addition, the heating of the hose in this method differs from dry heating in that the outer-surface and inner surface layers are appropriately vulcanized by heating using a direct steam atmosphere inside the hose. Accordingly, there is no water content as in the case of unvulcanized rubber, and deterioration due to oxidation is prevented. Furthermore, since the outer-surface layer is also appropriately vulcanized, a hose with favorable external appearance is obtained.

Next, a method for continuously vulcanizing a self-molding hose by means of external heating with the hose in a long, flat form, which is light in weight and easy to handle and ship, will be described.

With regard to the continuous formation of the hose in this method, the hose is continuously formed using the same continuous formation apparatus used in the aforementioned method for continuously vulcanizing a self-molding hose by means of internal heating. Specifically, a formed hose body which is circular in cross section is formed on the former of the aforementioned continuous formation apparatus by (a) forming a strip of the self-molding material with a specified width, and (b) wrapping this strip around the former with the vulcanized surface of the material on the inside, and with the edges of the strip overlapping each other, so that the unvulcanized surface of the self-molding material is exposed on the outside of the hose body. This circular hose body is passed between a multiple number of rotary-driven heating drums and taken up on a drum under a fixed tension, so that the hose is heated by contact with the heating drums, flattened and vulcanized. In this way, a long, flat hose is continuously manufactured.

Furthermore, with regard to the degree of vulcanization of the vulcanized topping layer of the self-molding part, the topping layer may be vulcanized to a degree of vulcanization which is slightly lower than the optimal degree of vulcanization taking into account the rate of hose formation, number of heating drums and vulcanization rate of the elastomer, etc. Furthermore, a multiple fibrous reinforcing material layer may also be used. Moreover, flanges which are shaped so that they contact the circular arcs at both edges of the hose when the hose is pressed into a flat form are installed on the rotary heating drums of the vulcanization apparatus.

Thus, the abovementioned flattened hose is formed from a self-molding material whose inner-surface layer has already been vulcanized. Accordingly, vulcanization can be completed in a relatively short period of time by heating the external surface of the hose. Furthermore, even though the hose is pressed into a flattened form and vulcanized by the heating drums, there is no danger that the external heating provided by the heating drums will cause any fluctuation in the thickness of the inner-surface layer of the hose, or that the heating will cause the interior surfaces of the flattened hose to stick to each other since the inner-surface layer is already vulcanized. Furthermore, since the outer-surface layer of the hose consists of an unvulcanized material, this outer-surface layer is vulcanized by contacting the heating drums equipped with flanges. As a result, a good outer-surface layer is formed; furthermore, good adhesion and complete flattening of the hose can be continuously obtained by the pressing and heating afforded by the heating drums.

The first embodiment is a self-molding hose which is characterized by the fact that a self-molding part is used in place of the outer-skin layer of the hose in a hose which may have any of various shapes, and which may consist of any of various elastomers, fibrous reinforcing materials and wire reinforcing materials.

A self-molding part is formed beforehand. A woven fabric (thickness: approximately 0.2 mm, 1300 mm (width)×100 m (length)) woven from a 200 d monofilament polyester yarn, as one example of an organic fiber material with a heat-shrinking capability which may be used to make up the self-molding part of the present invention, is subjected to RFL treatment. This fabric is then topped on both sides or only on the surface side with an elastomeric substance, the topping being accomplished by means of a calendar. For example, the thickness of the surface-side topping layer may be set at 0.5 mm and the thickness of the underside topping layer at 0.2 mm, for a total thickness of 0.9 mm. Of course, the thicknesses of the surface-side layer and underside layer may be appropriately altered in accordance with the intended use of the hose.

One example of an elastomer composition which can be used in the self-molding parts is as follows (expressed in parts by weight) 100 parts natural rubber, 5 parts ZnO, 2 parts stearic acid, 3 parts process oil, 30 parts white glaze, 0.3 parts accelerator TT, 0.9 parts accelerator CZ, 1.5 parts sulfur and 6.0 parts pigment (red color).

The rubber-coated fabric formed by topping the abovementioned heat-shrinkable woven fabric comprising polyester fibers with an elastomer is vulcanized under tension by means of a rotocure. A 0.2 mm topping layer of an unvulcanized elastomer comprising the same material as described above is applied to the 0.2 mm topping layer already on the underside of the vulcanized rubber coated fabric or directly to the underside of the fabric in cases where the underside was not topped. This material is then cut to a prescribed width and coiled up on a supporting shaft with an intermediate material such as peel-away paper, etc., interposed between the layers of the coil so that the material can easily be played out from the coil. In this example, a coil with a width of 100 mm was formed. Furthermore, the thicknesses of the topping layers of the self-molding part are taken as a general standard; however, the thicknesses of the topping layers are not limited to these values and may be appropriately altered in accordance with the application involved.

FIG. 1(A) is a magnified partial cross section of a self-molding part consisting of a rubber-coated fabric. This self-molding part SM consists of a vulcanized surface-side elastomer 1, a heat-shrinkable woven fabric 2, a vulcanized underside elastomer 3 and an unvulcanized underside elastomer 4. The self-molding part illustrated in FIG. 1(B) consists of a vulcanized surface-side elastomer 1, a heat-shrinkable woven fabric 2 and an unvulcanized underside elastomer 4.

Figure 2:
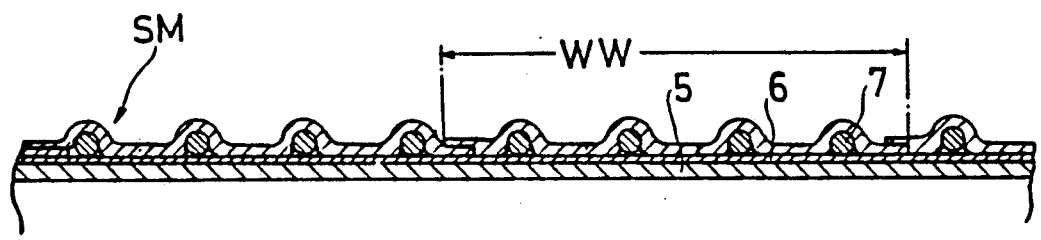
FIG. 2 is a partial cross-section of a wire-containing hose which uses a self-molding part shown in FIG. 1(A) in the outer layer of a hose.
Figure 2:
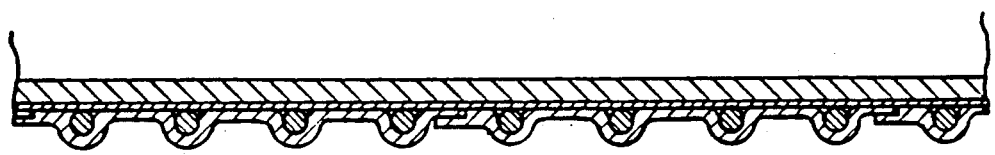

FIG. 2 is a partial cross section which illustrates one example of a wire-containing hose in which a self-molding part SM of the type illustrated in FIG. 1(A) is installed on the outside of the hose. One example of an elastomer composition which may be used in this wire-containing rubber hose is shown below (expressed in parts by weight).

100 parts natural rubber, 40 parts HAF carbon, 5 parts ZnO, 2 parts stearic acid, 2 parts process oil, 0.2 parts accelerator TT (TT=tetramethylthiuram disulfide), 0.8 parts accelerator CZ (CZ=cyclohexyl-benzothiazyl-sulfenamide) and 1.5 parts sulfur.

The wire-containing rubber hose in this example is normally as follows: i.e., an unvulcanized rubber layer with a thickness of 2 mm formed to an inner-surface elastomer 5 on a core mold consisting of an iron pipe with a diameter of 101.6 mm. A single layer of a reinforcing fabric 6 consisting of a nylon fabric (thickness: 1.6 mm) topped with an elastomer of the same composition as the inner-surface elastomer 5 is laminated on top of the inner surface elastomer 5. Furthermore, a steel wire with a diameter of 3 mm is wrapped in spiral form at a pitch of 20 mm around the outside of the reinforcing fabric 6.

Next, a pre-formed self-molding part SM with a wrapping width of WW (100 mm in the case of this example) is wrapped around the outside of the spiral-form reinforcing wire material 7 of this unvulcanized hose form so that the vulcanized surface-side elastomer 1 of the self-molding part SM is on the outside, and so that the unvulcanized underside elastomer of the part is inside. As a result of pressing contact, the wire is embedded in this self-molding part SM without leaving any gaps. The vulcanization of this wire-containing hose thus formed by pressing contact is connected by vulcanizing the hose for 40 minutes at 145° C. in a vulcanizing can.

The hose obtained as a result is a red-colored hose with high brightness; this hose has a smooth outer surface and a good, uniform adhesive force overall between layers. In the case of such a self-molding hose using a self-molding part, the three elements which make up a hose in a conventional restricting-fabric forming method i.e., reinforcing fabric, outer-surface rubber and restricting fabric for use in vulcanization are combined in a single process. Accordingly, in addition to achieving a reduction in the cost of the material used, the overall manufacturing process is shortened by approximately 30% i.e., the restricting fabric preparation process, wrapping and tightening process and loosening process are eliminated. Thus, in this case where a hose of the same type as a conventional product is manufactured by this method, the manufacturing costs can be reduced by approximately 30% or more. In other words, an extremely superior hose characterized by a simplified manufacturing process, stable quality, good adhesive strength, uniform shape, a smooth external surface and a high degree of brightness, etc., is provided by the present invention.

The abovementioned self-molding hose can be obtained by using a self-molding part SM on the outside of any of various types of conventional hoses.

Next, an embodiment of a self-molding hose which uses self-molding parts SM on both the inside and the outside of the hose will be described:

Specifically, this embodiment refers to a hose which may have any of various compositions in which self-molding parts are used in both the inner surface layer and outer-surface layer of the hose.

Figure 3:
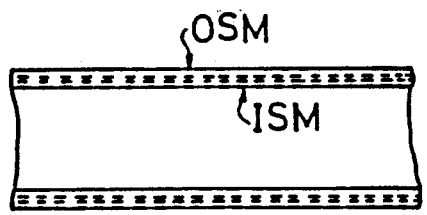
FIG. 3(A) is a partial cross sectional view of a self-molding hose which can be coiled in an extremely thin flat form.
FIG. 3(B) is an oblique view of a coil of the hose shown in FIG. 3(A)
Figure 3:
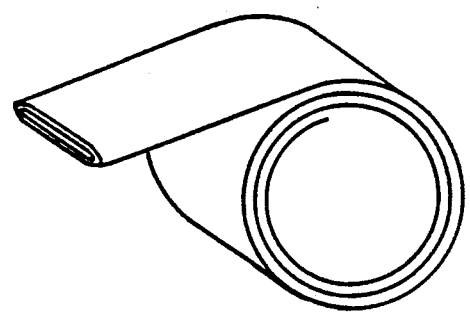

FIG. 3(A) is a partial cross section of a self-molding hose which can be coiled up in an extremely thin flattened form. In this hose, self-molding parts SM are used on both the inside and outside of the hose. This particular example uses self-molding parts SM of the type illustrated in FIG. 1(B).

In FIG. 3(A), OSM indicates the outer self-molding part i.e., a self-molding part SM which is installed on the outside of the hose, while ISM indicates the inner self-molding part i.e., a self-molding part SM which is installed on the inside of the hose. On the inner-surface side, the inner self-molding part ISM is formed in the form of a cylindrical tube with its vulcanized surface-side elastomer facing inward. On the outer-surface side, the outer self-molding part OSM is formed so that its vulcanized surface-side elastomer faces outward. Thus, the unvulcanized elastomers on the undersides of the respective self-molding parts are joined to each other, and the hose is vulcanized in this state. Accordingly, the hose can be formed with an extremely thin wall thickness and can therefore easily be coiled up in a flattened form as illustrated in the oblique view of a coil of the hose shown in FIG. 3(B).

In the case of a conventional hose containing a reinforcing fabric, e.g., in the case of a hose with a diameter of 100 mm, it is difficult to form the hose so that it can be coiled up in a flattened form unless a braided material is used as in a fire hose. In cases where an outer-surface rubber layer, reinforcing layer and inner surface rubber layer are laminated using a conventional hose manufacturing method, there are limits to how thin the hose can be made due to the weakness of the unvulcanized rubber and imprecision in the thickness of the material. Ordinarily, in the case of a hose with a diameter of around 100 mm, it is difficult to make the wall thickness of the hose less than 5 mm. Accordingly, in cases where such a hose is coiled in a flattened form, the flattened edges of the hose are at least 15 to 20 mm thick. As a result, it is difficult to coil a long length of hose. In the case of the abovementioned self-molding hose, on the other hand, a uniform wall thickness of approximately 2 mm can be obtained even in a hose with a diameter of 100 mm. Accordingly, in cases where such a hose is coiled on a drum, the length of hose that can be coiled is more than twice that which can be coiled in the case of a conventional hose. Furthermore, such a hose is light in weight and has considerable strength.

Figure 4:
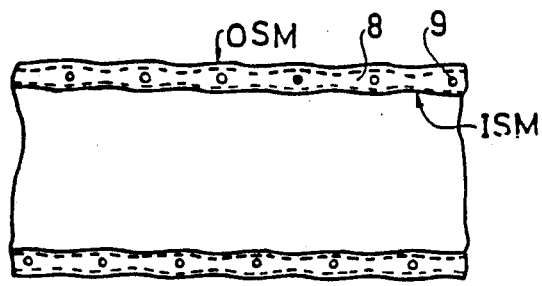
FIG. 4 is a partial cross sectional view of a self-molding hose which is reinforced by a spiral-form reinforcing wire material which has an adhesive coating.

FIG. 4 is a partial cross sectional view of a self-molding hose which has a relatively small wall thickness, and which is reinforced with a spiral-form reinforcing wire material which has an adhesive coating. This hose is formed by embedding a spiral-form reinforcing wire material in an elastomer in the intermediate portion of the structure illustrated in FIG. 3.

In FIG. 4, OSM indicates an outer self-molding part and ISM indicates an inner self-molding part as described above. Here, a spiral-form reinforcing wire material 9 impressing a small-diameter steel wire with an adhesive elastomer 8 and positioned in the area between the unvulcanized underside elastomers of the abovementioned self-molding parts OSM and ISM. This hose is formed as follows: i.e., the inner self-molding part ISM is formed in a cylindrical-tube form on a mandrel so that the vulcanized surface-side elastomer 1 of the self-molding part is on the inside. Next, the spiral-form reinforcing wire material 9 embedded in an adhesive elastomer 8 is installed on top of the the unvulcanized underside elastomer 4 of the cylindrical tube. Finally, the outer self-molding part OSM is laminated on top of this wire material 9 so that the vulcanized surface-side elastomer 1 of the self-molding part is on the outside. The hose is then cured by heating. Since this hose is relatively thin, an adhesive coating is formed on the surfaces of the spiral-form steel wire such as phosphate coating treatment or brass plating (6:4), etc. so that primary adhesion to the adhesive elastomer can be obtained.

As a result of this adhesive treatment, the spiral-form reinforcing wire material 9 with an adhesive coating forms a strong primary bond with the elastomer. Accordingly, the spiral orientation of the steel wire in the thin hose is maintained, and the resistance to bending is increased so that good shape recovery is obtained in the thin hose. As a result, an accurate internal diameter is maintained over a long period of time, and a good flexibility can be obtained.

Figure 5:
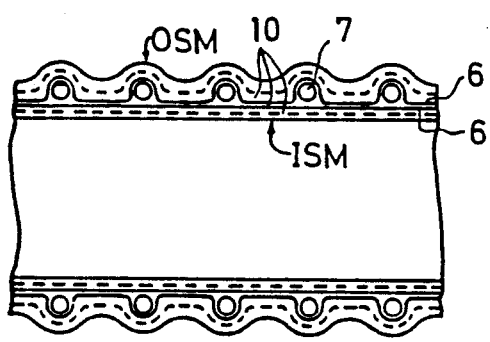
FIG. 5 is a partial cross sectional view of a self-molding hose with a reinforced intermediate layer.
Figure 7:
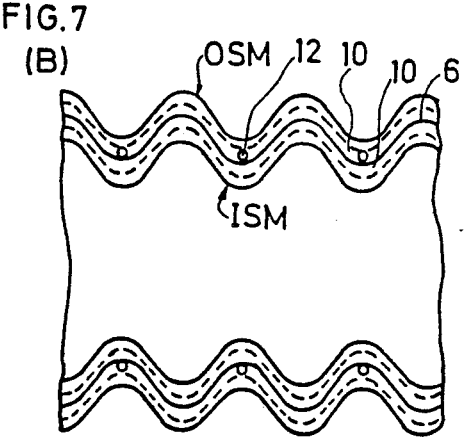

FIG. 5 is a partial cross sectional view of a reinforced self-molding hose in which a reinforcing wire material, an unvulcanized elastomer sheet and a reinforcing fiber material are installed in the intermediate layer of the hose.

In FIG. 5, OSM indicates an outer self-molding part and ISM an inner self-molding part. Also, the reference numeral 6 is a reinforcing fabric, 10 is an unvulcanized elastomer sheet, and 7 is a single-strand spiral-form reinforcing wire material. This spiral-form reinforcing wire material 7 is embedded by installing sheets of the reinforcing fabric 6 above and below the wire material 7 and by installing unvulcanized elastomer sheets 10 between the sheets of fibrous fabric and above and below the sheets of fibrous fabric. The self-molding parts are bonded to the inner and outer surfaces of this intermediate layer, and the hose is cured by heating in this state. In this example, the external surface is formed in a spiral wave shape. Of course, it would also be possible to form a smooth external surface.

In this example, a self-molding part with a vulcanized surface-side elastomer 1 is used on the interior surface of the hose. Accordingly, there is no fluctuation in the thickness of the elastomer even during installation of the aforementioned spiral-form reinforcing wire material, etc. Thus, an accurate wall thickness is maintained, so that a high-precision hose can be obtained.

Figure 6:
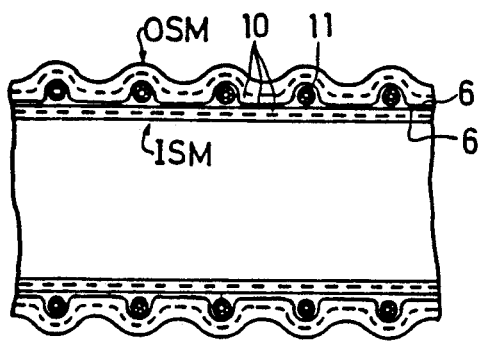
FIG. 6 is a partial cross sectional view of a self-molding hose which uses a stranded wire to reinforce the intermediate layer of the hose.
Figure 7:
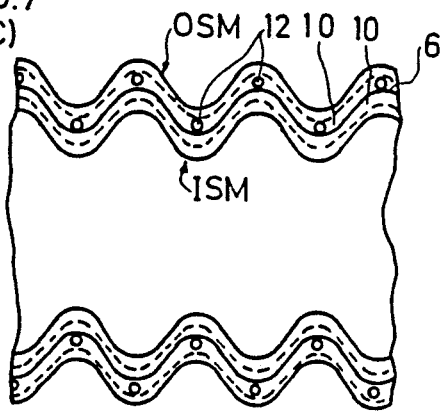

FIG. 6 is a partial cross sectional view of a self-molding hose which uses a stranded wire as a spiral-form reinforcing wire material.

In this example, a steel cord formed from a multiple number of wire strands is used instead of the single-strand spiral-form reinforcing wire material used in the construction illustrated in FIG. 5. This system can also be used depending on the application in the case of a relatively thin hose such as that illustrated in FIG. 4.

As shown in FIG. 6, this construction is the same as the construction shown in FIG. 5, except for the fact that a spiral-form stranded wire 11 is used instead of the single-strand spiral-form reinforcing wire 7 used in the hose illustrated in FIG. 5. The cross sectional shape of this stranded wire may be appropriately selected in accordance with the application involved i.e., the shape may be circular or elliptical, etc.

A special feature of this hose is that since the reinforcing wire material is a stranded wire, the resistance to wrapping during hose formation is small. Accordingly, a large-diameter wire cord can be installed even in a small diameter hose. Furthermore, in the case of a single-strand reinforcing wire, the application of a great bending force to the hose may cause buckling and permanent deformation so that the hose becomes unusable. In the case of a stranded reinforcing wire, on the other hand, the hose will recover its original shape. Accordingly, in applications where the hose is subjected to repeated deformation, the bending fatigue of the wire material is large in the case of a single-strand wire, so that the hose is easily damaged. In the case of a multi-strand wire, on the other hand, the bending fatigue is small, so that high durability is obtained.

Figure 7:
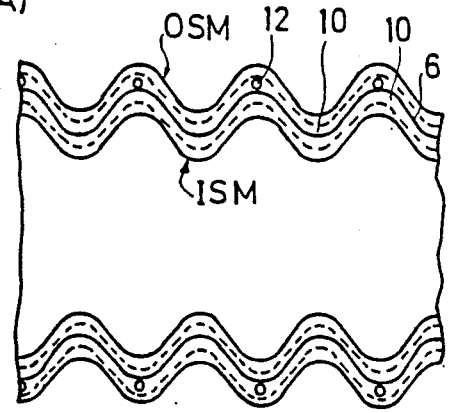
FIGS. 7(A), 7(B) and 7(C) are partial cross sectional views of accordion-form self-molding hoses which can be expanded and contracted in length.

FIGS. 7(A), 7(B) and 7(C) are partial cross-sectional views of expandable-contractible self-molding hoses whose inner and outer surfaces are formed in an accordion-like configuration.

In the Figures, ISM indicates an inner self-molding part and OSM an outer self-molding part. The reference numeral 6 is a reinforcing fabric topped with an unvulcanized elastomer which is inserted as a reinforcing material in addition to the self-molding parts, 10 indicates unvulcanized elastomer sheets which are installed on both surfaces of the reinforcing fabric 6, and 12 indicates a single-strand ring-form reinforcing wire.

The structures of these expandable-contractible self-molding hoses, which have accordion-like folds so that then can easily be expanded in length by pulling, can be formed using only a wave-form former of a required length, with no need for a conventional restricting fabric or metal mold.

The structure illustrated in FIG. 7(A) is formed as follows: i.e., a self-molding part formed by bonding the required unvulcanized elastomer sheets 10 and reinforcing fabric 6 to an inner self-molding part ISM which has a vulcanized topping layer vulcanized to an appropriate degree of vulcanization on its inside surface is wrapped around a wave-form former which is circular in cross section so that the self-molding part is formed into a tube which conforms to the surface of the former. Next, rings of the ring-form reinforcing wire material 12 are embedded in the outer unvulcanized elastomer sheet 10 at the apexes of the peak portions of the accordion configuration. Afterward, an outer self-molding part OSM is applied to the outside of this assembly, so that the outer surface is caused to conform to the accordion configuration. The hose is then cured by heating. Next, the hose is removed from the former by blowing compressed air into the hose from one end. In this way, an expandable-contractible self-molding hose is constructed.

FIG. 7(B) illustrates a structure in which rings of the ring-form reinforcing wire material 12 are embedded in the unvulcanized elastomer sheet 10 in the valley portions of the accordion configuration. FIG. 7(C) illustrates a structure in which the rings of the ring-form reinforcing wire material 12 are embedded in the unvulcanized elastomer sheet 10 in both the peak portions and the valley portions of the accordion configuration.

In cases where the ring-form reinforcing wire material is installed in the valley portions and/or peak portions of the accordion configuration, removal of the hose following heating and curing may be facilitated by using a split former. etc., for the former.

Special features of the abovementioned hoses are as follows: i.e., manufacture is simple and the surface of the hose is smooth. Furthermore, superior effects in terms of heat resistance, wear resistance, weather resistance, chemical resistance and resistance to bending fatigue, etc. which cannot be obtained in a resin hose, are obtained in the case of tubing where expansion and contraction are required e.g., in expanding and contracting ducts, etc.

Figure 8:
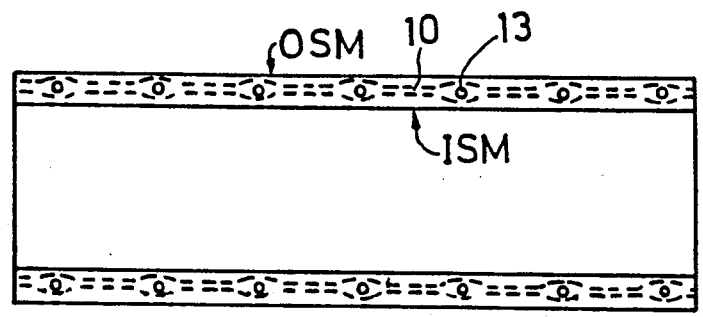
FIG. 8(A) is a partial cross sectional view of a self-molding hose with a smooth, flat surface which can be formed into a shape with indentations and projections.
FIG. 8(B) is a partial cross sectional view of a self-molding hose, the internal and external surfaces thereof deformed into and fixed in a shape with indentations and projections.
Figure 8:
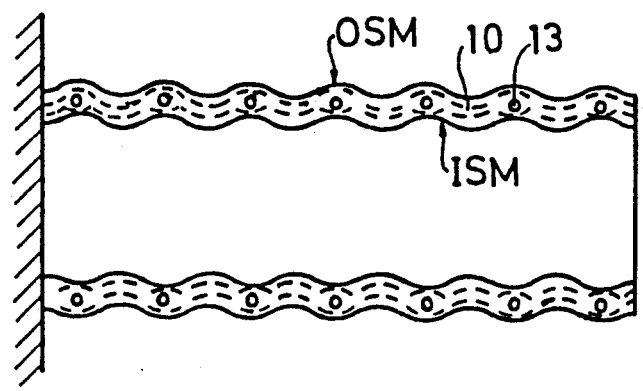

FIGS. 8(A) and 8(B) show a self-molding hose which can easily be formed into a shape with indentations and projections by applying a torsional stress to the hose. This hose is formed with both the interior and exterior surfaces in a smooth, flat state by installing an unvulcanized elastomer sheet 10 and a spiral-form reinforcing wire material 13 comprising a small-diameter steel wire between an inner self-molding part ISM and an outer self-molding part OSM, and then curing the hose by heating it in this state.

FIG. 8(A) is a partial cross sectional view of the abovementioned self-molding hose which can be formed into a shape with indentations and projections, showing the horse in a smooth, flat surface state. FIG. 8(B) is a partial cross section of the self-molding hose, showing the hose after it has been twisted and fixed so that the internal and external surfaces are deformed into a shape with indentations and projections.

Specifically, the structure of the self-molding hose which can be formed into a shape with indentations and projections shown in FIG. 8(B) is formed as follows: i.e., one end of the hose formed with its internal and external surfaces in a smooth, flat state by installing the spiral-form reinforcing wire material 13 between the ISM and OSM is fixed in place, and the other end of the hose is twisted in the same direction as the spiral wrapping direction with respect to the axis of the hose, i.e., in the direction which causes the diameter of the hose to contract, so that the hose is deformed. This end of the hose is then fixed with the hose in this deformed state. As a result of this process, wrinkles are formed in the internal and external surfaces of the hose, so that the hose has wavy surfaces in the form of spiral screw threads. Accordingly, the resistance to the passage of a fluid through the hose is conspicuously increased.

A special feature of this hose is as follows: i.e., since self-molding parts are used, a small, uniform wall thickness can be obtained in the hose. Accordingly, the resulting hose is (as described above) a self-molding hose whose internal and external surfaces can be deformed into a shape with indentations and perfections by twisting and fixing the hose.

Accordingly, when the hose is installed with its surfaces in a smooth, flat state in a fluid supply line system, it has the same internal diameter as the other lines in the system, so that there is no particular increase in the resistance to the passage of the fluid through the hose. When the hose is twisted, however, the resulting decrease in the internal diameter of the hose and formation of indentations and projections causes an increase in the resistance of the hose to the passage of the fluid, so that a valve mechanism is formed which regulates the flow rate and pressure of the fluid as it is delivered.

The self-molding hoses described above have the special features described in the respective embodiments. Hoses of various types, which range from extremely thin hoses to thick hoses and which are suitable for use in a wide range of applications, can be produced. Furthermore, compared to conventionally formed hoses, the manufacturing process of these hoses is simplified, and good molded hoses can easily be obtained at low cost.

FIG. 9 is a schematic explanatory diagram of continuous forming and vulcanizing apparatus which illustrates one example of a method for continuously vulcanizing a self-molding hose by means of internal heating. On the left side of the apparatus is a former F which continuously forms a hose using self-molding parts.

This former F is designed such that a multiple number of feed bars 15 are arranged so that they are are each inclined by a predetermined amount and are fixed in place by a mounting frame 16. Thus, the feed bars 15 provide a screw action. The former F is driven by a driving device 17 so that it rotates at a constant circumferential speed. The hose that is formed uses self-molding parts SM on both the inside and outside of the hose. In this example, self-molding parts of the type illustrated in FIG. 1(B) are used. The thickness of the vulcanized surface-side elastomer 1 is set at 0.4 mm that of the heat-shrinkable woven fabric 2 is set at 0.2 mm, and that of the unvulcanized elastomer 4 is set at 0.4 mm, for a total thickness of 1 mm.

The hose shown in FIG. 9 is formed as follows: i.e., the end of an inner self-molding part ISM with a specified width is wrapped around the rotating former F so that the edges of the self-molding part overlap by approximately 10 mm in each turn, thus forming a cylindrical tube with the vulcanized surface-side elastomer 1 facing inward. Next, a reinforcing wire material comprising a steel wire is wrapped around the outside of this tube in order to form a spiral-form reinforcing wire material 13. In this example, the pitch at which this wire is wrapped is set at approximately 50 mm; however, the pitch and number of wires may be altered according to the pressure resistance desired, etc. Next, an outer self-molding part OSM having a specified width is wrapped around the outside of this assembly so that a cylindrical hose body is formed. This hose body is continuously formed and fed out by the screw motion of the of the former F. The formed hose is vulcanized in the action range S of steam supplied from a jet part J located at the tip of a steam pipe 14 which is adiabatically supported in the center of the mounting frame 16 of the former F.

In this embodiment, the internal diameter of the rubber hose is 100 mm, the rate of hose formation is 5 mm/sec and the vulcanization time is 600 seconds. Accordingly, as shown in FIG. 11, the action range S of the vulcanizing team is 5 mm×600=3000 mm.

Figure 10:
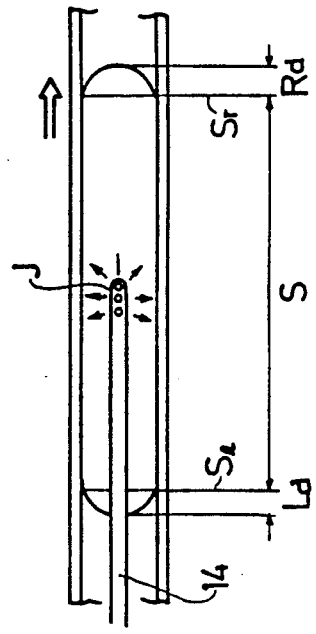
FIG. 10 is a magnified schematic explanatory diagram which illustrates the make-up of the steam action range in which continuous vulcanization is performed.

As shown in FIG. 10, S indicates the left end of the steam action range S, and Sr indicates the right end of the steam action range S. Also, Ld is the drain conversion distance at S, and Rd is the drain conversion distance at Sr.

The time td required for the temperature to drop to 100° C. from the temperature of 140 C. at the jet part is approximately 4.7 seconds; accordingly, Ld×Rd=Z3.5 mm.

Figure 11:
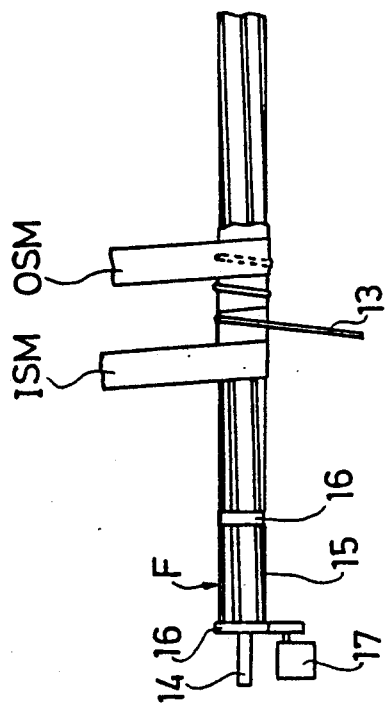
FIG. 11 is a dimensional diagram which illustrates one example of a steam action range with a specified length.
Figure 11:
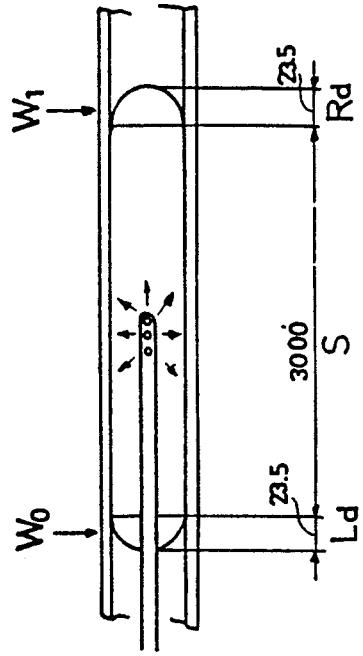

In FIG. 11, the steam action range S is 3000 mm, the drain conversion distances Ld and Rd are both 23.5 mm, and Wo and W1 indicate water cooling.

Figure 12:
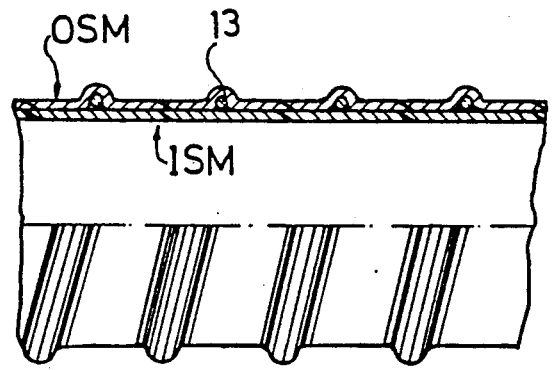
FIG. 12 is a partial cross sectional view which illustrates one portion of a self-molding hose formed and vulcanized by a continuous vulcanization method using internal heating.

FIG. 12 is a partial cross section which illustrates a portion of a hose formed and vulcanized by the above-mentioned continuous vulcanization method using internal heating. In FIG. 12, reference numeral 13 indicates a spiral-form reinforcing wire material comprising a steel wire, and ISM and OSM indicate inner and outer self-molding parts, respectively.

In this continuous vulcanization method, as described above, the hose body is continuously formed by wrapping inner and outer self-molding parts whose vulcanized surfaces face inward and outward, respectively, around the surface of a former to form the inside layer and outside layer of the hose. Accordingly, vulcanization can be completed in a continuous process by internal heating alone. As a result, a long hose of any desired length can be produced at a low cost, since the forming operation using a restricting fabric as well as numerous other partial processes required in conventional methods can be eliminated. Furthermore, there is no need for vulcanizing equipment such as large-scale vulcanizing cans, etc., and a high thermal efficiency can be obtained. Moreover, since the internal and external surfaces of the hose are vulcanized beforehand, it is necessary merely to vulcanize the unvulcanized elastomer between the self-molding parts in order to complete the vulcanization of the hose. Accordingly, vulcanization can be accomplished by directly heating the interior surface of the hose with steam. Furthermore, there is no water content as in the case of unvulcanized rubber, so that any deleterious action is prevented. In addition, since there is no pressing by means of a restricting fabric, soiling of the outside surface and damage to the surface are prevented.

Figure 13:
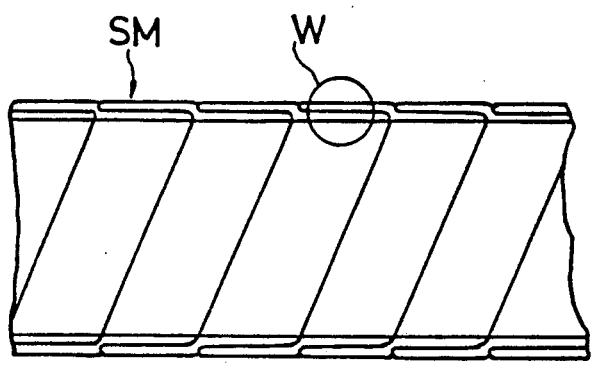
FIG. 13 is a partial schematic structural diagram (heat-shrinkable woven fabric omitted in this diagram) of a round formed hose prior to flattening in a method for continuously vulcanizing a self-molding hose by external heating.
Figure 14:
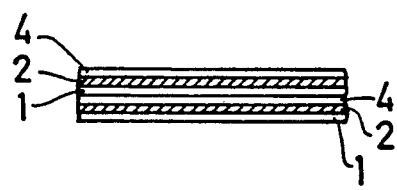
FIG. 14 is an enlarged structure diagram of the wall thickness portion in FIG. 13.

FIG. 13 is a partial schematic structural diagram (the heat-shrinkable woven fabric is omitted from this Figure) which illustrates one example of a cross-sectionally circular hose during continuous formation on a former F prior to flattening in the method of the present invention for continuously vulcanizing a self-molding hose by external heating while the hose is in a flattened state. Here, SM indicates a self-molding part. As indicated by FIG. 14, which is an enlarged structural diagram of wall-thickness portion W of the hose shown in FIG. 13, this self-molding part SM, which comprises a vulcanized surface-side elastomer 1, a heat-shrinkable woven fabric 2 and an unvulcanized underside elastomer 4, is formed into a strip having a specified width, and is wrapped with some overlap around a rotating former so that the strip is formed into a cross-sectionally circular tube with the vulcanized surface-side elastomer 1 on the inside. Accordingly, in this formed hose, the interior surface of the hose is formed by the aforementioned vulcanized surface-side elastomer 1. Meanwhile, in the overlapping bonded areas, the unvulcanized underside elastomer 4 and the vulcanized surface-side elastomer 1 are pressed together. Finally, the exterior surface of the hose is formed by the unvulcanized underside elastomer 4.

In this embodiment, the internal diameter of the hose is 100 mm and the external diameter of the hose is 108 mm; in this self-molding part SM, in other words, the thickness of the vulcanized surface-side elastomer 1 is set at 0.4 mm, the thickness of the heat-shrinkable woven fabric 2 is set at 0.2 mm, and the thickness of the unvulcanized underside elastomer is set at 0.4 mm. This self-molding part SM is formed into a strip having a specified width, and is supplied to the former F shown in FIG. 15.

Figure 15:
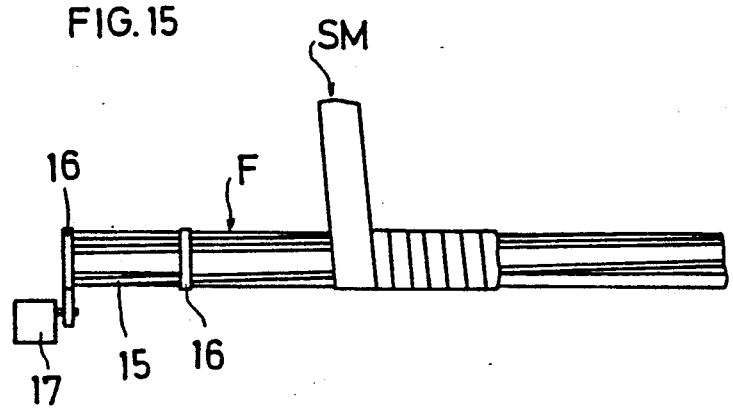
FIG. 15 is a schematic diagram of a rotary former used for continuous formation of a self-molding hose.

FIG. 15 is a schematic diagram of the rotary former used for continuous formation of the hose in this embodiment. This former is the same as the former F used for the aforementioned self-molding hose vulcanized by internal heating, except that the steam pipe 14 is removed. Accordingly, when this strip-form self-molding part SM having a specified width is wrapped with some overlap around the rotary former, it is formed into a cylindricall hose. This hose is fed out by the rotation of the former, and is introduced into a vulcanizing apparatus. In this embodiment, the rate of hose formation is 5 mm/sec, and the time required for vulcanization of the hose is 600 seconds at 140° C.

FIG. 16 is a schematic diagram which illustrates one example of the vulcanizing apparatus used in this method. This vulcanizing apparatus uses a combination of three heating drums, each of which has an external diameter of 1274 mm. The external surface temperature of the heating drums is set at 150° C.

In FIG. 16, SM indicates the self-molding part, and RH indicates a round hose which is formed and fed out by the former F. The hose is flattened and vulcanization is completed by running the hose between the heating drums 18, 19 and 20. The hose is then coiled as a flat hose FH. Furthermore, with regard to this vulcanizing apparatus, the apparatus may be constructed using various numbers and combinations of heating drums as well as guide drums, etc., for introduction and feed-out of the hose in accordance with the thickness of the hose and rate of vulcanization, etc.

FIG. 17(A) is a cross-sectional view taken along line r—r in the round hose RH shown in FIG. 16. This illustrates a round cross section of the hose formed and fed out by the former F. This round hose is introduced into the vulcanizing apparatus and passed between the heating drums, so that it is heated, flattened and vulcanized.

FIG. 17(B) is a cross sectional view taken along line f—f in FIG. 16. Specifically, this illustrates the cross-sectional form of the flat hose that is formed when the round hose formed in a round form is vulcanized in a flattened form.

In FIG. 17(B), To indicates the thickness of the flat hose at both edges. This thickness is approximately twice the wall thickness of the round hose. Furthermore, a uniform flat state is obtained.

FIG. 17(C) is a cross section which illustrates the hose form that results from internal-pressure loading when water is pressure-fed through the flat hose FH at an internal pressure of 1 kg/cm$^2$. It is seen that the original round hose form is easily recovered during use.

FIG. 18 illustrates a conventional example. This figure is a cross sectional view of a hose of the same size as that in the above embodiment. However, this Figure illustrates a hose which is obtained by the conventional method described in Japanese Patent Publication No. 62-49863, in which a cylindrical hose is vulcanized "as is", and then flattened. FIG. 18(A) is a cross section of the hose vulcanized in cylindrical form. FIG. 18(B) is a cross section of the flat hose obtained by the conventional method of flattening after vulcanization. As is shown in FIG. 18(B), it is difficult to achieve complete flatness in the cross section of a flat hose obtained by flattening a round vulcanized hose. The thickness T1 at both edges of the flat hose is approximately 2.5 times the value obtained by doubling the wall thickness of the round hose.

FIG. 18(C), like FIG. 17(C), is a cross section of the hose during internal-pressure loading. Thus, as shown in the Figures, a flat hose obtained by a conventional method has an indented surface. Accordingly, when such a hose is stored by being coiled on a reel, etc., this shape leads to an unstable state which may cause the coil to fall apart. Furthermore, the coil diameter of such a coiled hose is at least approximately twice the coil diameter of a coiled long hose embodying the present invention.

Thus, in the continuous vulcanization method of the present invention, a hose is continuously formed by the simple operation of wrapping a single self-molding part, and vulcanization and flattening are accomplished in a continuous manner by means of an external heating system alone. Accordingly, a long, flat hose of any desired length can easily be produced. As a result, such a hose can be produced at an extremely low cost, and a good, completely flattened product can be obtained.

We claim:

1. A method for continuously vulcanizing a self-molding hose by external heating comprising the steps of:
   forming a continuous strip of self-molding material, said continuous strip of self-molding material being made by the steps of:
   providing a first unvulcanized elastomer topping layer on a top surface of a heat shrinkable woven fabric;
   providing a second unvulcanized elastomer topping layer on an under surface of said heat shrinkable woven fabric, said second unvulcanized elastomer topping layer being thinner than said first unvulcanized elastomer topping layer and vulcanizing said first and second unvulcanized elastomer topping layers to form first and second vulcanized elastomer topping layers; and
   providing an unvulcanized elastomer topping layer on the underside of said second vulcanized elastomer topping layer;
   wrapping said continuous strip of self-molding material on a former with a portion of said first vulcanized elastomer topping layer overlapping a top surface of said unvulcanized elastomer topping layer of a previous winding of said strip of self-molding material to form a circular hose; and
   continuously introducing said circular hose into a gap between rotary drums of a vulcanization apparatus comprising a combination of heating drums rotated at the same rate as the rate of said circular hose formation so that said hose is pressed flat, heated, vulcanized and converted into a flat hose.

* * * * *